M. W. KIDDER.
Method of and Apparatus for Determining the Measure of Steam.
No. 220,292. Patented Oct. 7, 1879.

Witnesses.
L. W. Fairchild
Geo. W. Pierce.

Inventor;
M. W. Kidder
by Wright H Brown
Attys

N. PETERS, PHOTO-LITHOGRAPHER, WASHINGTON, D. C.

UNITED STATES PATENT OFFICE.

MOSES W. KIDDER, OF LINCOLN, MASSACHUSETTS.

IMPROVEMENT IN METHOD OF AND APPARATUS FOR DETERMINING THE MEASURE OF STEAM.

Specification forming part of Letters Patent No. 220,292, dated October 7, 1879; application filed August 14, 1879.

*To all whom it may concern:*

Be it known that I, MOSES W. KIDDER, of Lincoln, in the county of Middlesex and State of Massachusetts, have invented certain Improvements in Methods of and Apparatus for Determining the Measure of Steam used in Steam Heating or Cooking Apparatus, of which the following is a specification.

This invention has for its object to more accurately and conveniently determine the measure of steam used in steam-heating apparatus than heretofore, and is intended for use in connection with systems of steam-heating for cities and towns wherein pipes are laid in the streets extending from a central battery of boilers to the buildings to be heated.

My invention is, essentially, a method of measuring steam expended in heating; and it consists in weighing or measuring the water of condensation formed in apparatus heated by steam.

The invention also consists in the provision of automatic means whereby the water condensed in a steam radiator or heater is automatically weighed or measured and the quantity indicated, all of which I will now proceed to describe and claim.

Figure 1:
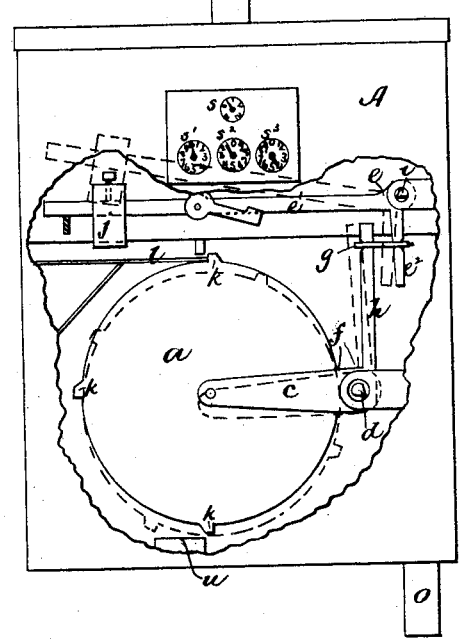
Figure 2:
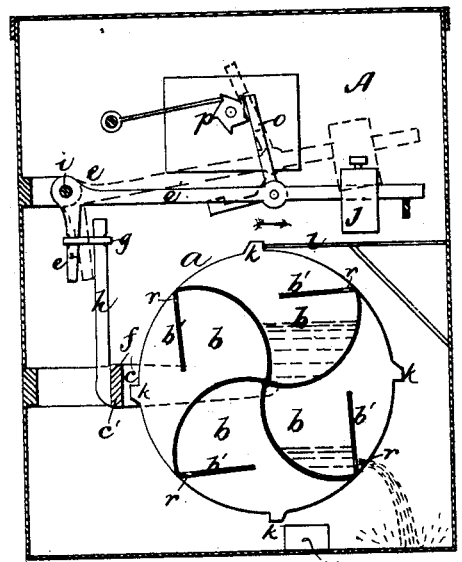
Figure 3:
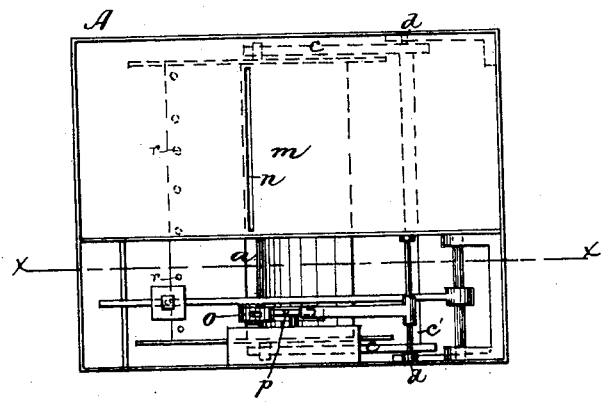
Figure 4:
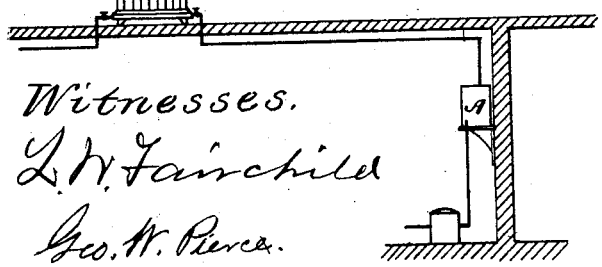

Of the accompanying drawings, forming a part of this specification, Figure 1 represents a side view of an apparatus whereby my invention may be carried into effect, a part of the casing inclosing the apparatus being broken away. Fig. 2 represents a section on line $x\,x$, Fig. 3; and Fig. 3 represents a top view of the apparatus with the top of the casing removed. Fig. 4 represents a view on a reduced scale, showing a steam heater or radiator with an apparatus embodying my invention applied to it.

Similar letters of reference indicate similar parts in all the figures.

In carrying out my invention I provide any suitable means for ascertaining the quantity of water condensed in either a steam-heating radiator or cooking apparatus in an apartment or building.

The drawings represent a convenient and practical form of apparatus for the purpose named, although my invention is by no means confined to said apparatus; but as it serves to fully illustrate the invention, I will proceed to describe it in detail.

A represents a rectangular box or casing containing the apparatus about to be described. Said casing is provided at its upper portion with an inlet-pipe, I, and at its lower portion with an outlet-pipe, O.

The inlet-pipe I is suitably connected to a steam heater or radiator, S, so that the water of condensation will pass from the latter into the casing A, a suitable steam-trap being placed between the heater or radiator and the casing A.

The outlet-pipe O conducts the water from the casing after it has been measured.

$a$ represents a rotary wheel having a horizontal axis, and provided with buckets $b$, similar to those of an overshot water-wheel, excepting that said buckets are partially closed by flanges $b'$, arranged as shown in Fig. 2.

The wheel $a$ is adapted to move vertically, its journals being supported in a frame, $f$, composed of two arms, $c\,c$, and a horizontal cross-bar, $c'$, connecting said arms. Said frame is pivoted at $d\,d$ to supports rigidly attached to the casing, and its arms $c\,c$ are thus adapted to vibrate in vertical planes, and permit the upward and downward movement of the wheel $a$. The vibrations of the arms $c\,c$ and the vertical movements of the wheel are limited by suitable stops, and the wheel is held normally at the upward extreme of its movement by a weighted bell-crank lever, $e$, having a long arm, $e^1$, and a short arm, $e^2$, and is pivoted at $i$ to a rigid support on the casing.

The arm $e^2$ of said lever is connected by a link, $g$, with an arm, $h$, which is rigidly attached to the frame $f$. The longer arm, $e^1$, is provided with a movable weight, $j$.

The wheel is provided with teeth $k$, corresponding in number and position to the buckets $b$, and a dog, $l$, rigidly attached to the casing A, engages with one of said teeth, and prevents the rotation of the wheel in the direction indicated by the arrow in Fig. 2 when the wheel is in its highest position.

The casing A is provided with a tank, $m$, in its upper portion to receive the water entering through pipe I, and said tank has in its bottom a slot, $n$. The wheel $a$ is so arranged that its upper bucket will be directly under the slot $n$, and will receive water from the tank when the wheel is held by the dog $l$. Each bucket $b$ is of such capacity that when it is partially or wholly filled with water it will overcome the weight of the described devices which support the wheel, and give the latter a downward motion, which disengages the wheel from the dog $l$, and thus allows it to be rotated in the direction of the arrow by the weight of water in the upper bucket, and at the same time raises the arm $e^1$ of the lever $e$ through the intermediate mechanism. Said arm $e^1$ is provided with a dog, $o$, which, when the arm $e^1$ rises, engages with a tooth of a ratchet, $p$, and when the arm descends gives said ratchet a partial rotation. As soon as the downward movement of the wheel is effected, consequent partial rotation thereof causes a sufficient portion of the water that depressed the wheel to escape through perforations $r$ in the flanges $b'$, to lighten the wheel and enable it to be lifted to its former position by the weighted lever and connected mechanism described, before the wheel has made a partial rotation of sufficient extent to bring its next tooth $k$ to the point when it would engage the dog $l$. Hence the wheel can only rotate far enough after each depression to bring its next bucket into position to be filled from the tank, the wheel being then stopped by the dog $l$.

The perforations $r$ permit the water to escape somewhat slowly from the depressed bucket, so that the weight of water in said bucket is caused to prevent any tendency of the wheel to rotate backwardly before the water accumulates in the upper bucket.

It will be seen that the upward and downward movements of the wheel are accompanied by corresponding movements of the arm $e^1$, the latter moving in an opposite direction from the former.

Each descent of the arm $e^1$ causes a partial rotation of the ratchet $p$, as already described. Said ratchet is located on a shaft, which is provided with a pinion forming a part of a suitable train of gearing, whereby index-fingers $s$ $s^1$ $s^2$ $s^3$, running over graduated circles, are operated. Said fingers indicate the depressions of the wheel $a$, and therefore the quantity of water received and discharged thereby.

To insure the prompt upward movement of the wheel $a$ and effect its stoppage at the proper time by the dog $l$ after each depression of the wheel, I provide a fixed raised surface, $u$, which is so located that one of the teeth $k$ will come in contact with it as the wheel rotates. Said surface is nearer the axis of the wheel at one end than at the other, as shown, so that as the tooth passes over the surface said tooth with the wheel will be impelled upwardly by the surface far enough to insure the engagement by the dog $l$ of the tooth succeeding the one last released.

I claim as my invention—

1. The herein-described method of determining the measure of steam used in steam heating and cooking apparatus, consisting in weighing or measuring the water condensed in said apparatus, as set forth.

2. In combination with either steam heating or cooking apparatus, means whereby the water condensed in such apparatus may be automatically weighed or measured and the quantity of such water registered, as set forth.

3. As a means for indicating the quantity of the water condensed in either a steam heating or cooking apparatus, a vertically-movable rotary wheel, having buckets arranged to receive the water condensed in such apparatus, means whereby said wheel is supported and prevented from rotating until a given quantity of water accumulates in one of its buckets, and is then allowed to fall and partially rotate to discharge the accumulated water, and indicating mechanism operated by the movement of the wheel, all as set forth.

In testimony whereof I have signed my name to this specification, in the presence of two subscribing witnesses, this 12th day of August, 1879.

MOSES W. KIDDER.

Witnesses:
  C. F. BROWN,
  GEO. W. PIERCE.